(12) United States Patent
Li et al.

(10) Patent No.: US 10,904,846 B2
(45) Date of Patent: Jan. 26, 2021

(54) SYNCHRONIZATION METHOD AND DEVICE (71) Applicant: CHINA ACADEMY OF TELECOMMUNICATIONS TECHNOLOGY, Beijing (CN)

(72) Inventors: Yuanyuan Li, Beijing (CN); Haijun Zhou, Beijing (CN); Li Zhao, Beijing (CN); Ying Peng, Beijing (CN); Jiayi Fang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 176 days.

(21) Appl. No.: 16/073,284

(22) PCT Filed: Jan. 11, 2017

(86) PCT No.: PCT/CN2017/070899
§ 371 (c)(1),
(2) Date: Jul. 26, 2018

(87) PCT Pub. No.: WO2017/128956
PCT Pub. Date: Aug. 3, 2017

(65) Prior Publication Data
US 2019/0037510 A1 Jan. 31, 2019

(30) Foreign Application Priority Data
Jan. 29, 2016 (CN) .......................... 2016 1 0067213

(51) Int. Cl.
*H04W 56/00* (2009.01)
(52) U.S. Cl.
CPC ..... *H04W 56/001* (2013.01); *H04W 56/0015* (2013.01)

(58) Field of Classification Search
CPC .. H04W 56/0065; H04W 24/08; H04L 69/324
See application file for complete search history.

(56) References Cited

U.S. PATENT DOCUMENTS 9,596,668 B2 * 3/2017 Yoon ...................... H04W 76/14
10,021,536 B2 * 7/2018 Morita .............. H04W 52/0219
(Continued)

FOREIGN PATENT DOCUMENTS

| CN | 102056285 A | 5/2011 |
|---|---|---|
| CN | 102271391 A | 12/2011 |

(Continued)

OTHER PUBLICATIONS

The Extended European Search Report for PCT Application No. PCT/CN2017070899 dated Dec. 19, 2018, 9 pgs.
(Continued)

*Primary Examiner* — Hassan Kizou
*Assistant Examiner* — Hector Reyes
(74) *Attorney, Agent, or Firm* — Womble Bond Dickinson (US) LLP (57) ABSTRACT

Disclosed are a synchronization method and device, which are used to achieve the distinction of a synchronization system and a synchronization level of a node in a V2V communication system, thereby quickly achieving the synchronization in the V2V communication system. Provided is a synchronization method, comprising: determining a synchronization priority level of a current node; and according to the synchronization priority level of the current node, determining a synchronization sequence used by the current node and a value of a distinguishing flag bit of the current node, wherein the distinguishing flag bit is used to distinguish whether the current node belongs to a GNSS synchronization system or an eNB synchronization system.

7 Claims, 6 Drawing Sheets

(56) References Cited

U.S. PATENT DOCUMENTS

| | | | |
|---|---|---|---|
| 2008/0129591 A1* | 6/2008 | Lamance | G01S 19/11 |
| | | | 342/357.42 |
| 2015/0264588 A1 | 9/2015 | Li et al. | |
| 2016/0037466 A1* | 2/2016 | Yang | H04W 48/20 |
| | | | 370/350 |
| 2017/0006568 A1* | 1/2017 | Abedini | H04W 56/0015 |
| 2018/0199299 A1* | 7/2018 | Wakabayashi | H04W 56/002 |
| 2018/0213498 A1* | 7/2018 | Khoryaev | H04W 56/0015 |
| 2018/0234928 A1* | 8/2018 | Yasukawa | H04W 4/70 |
| 2019/0037513 A1* | 1/2019 | Yang | H04W 4/46 |

FOREIGN PATENT DOCUMENTS

| | | |
|---|---|---|
| CN | 104735774 A | 6/2015 |
| JP | 2017510191 A | 4/2017 |
| JP | 2017528936 A | 9/2017 |
| WO | WO 2014182342 A1 | 11/2014 |
| WO | 2015137781 A1 | 9/2015 |
| WO | 2015194859 A1 | 12/2015 |

OTHER PUBLICATIONS

The Japanese Office Action of Application No. 2018539438, dated Jun. 25, 2019, 3 pgs.

State IP Office of PR China—International Search Report of International Searching Authority (with an English translation) dated Mar. 30, 2017 for International Application No. PCT/CN2017/070899 (5 pgs).

State IP Office of PR China—Written Opinion of International Searching Authority dated Mar. 30, 2017 for International Application No. PCT/CN2017/070899 (3 pgs).

LG Electronics, "Discussion on synchronization enhancement for PC5-based V2V," 3GPP TSG RAN WG1 Meeting #83, Nov. 15-22, 2015, R1-156895, Anaheim, USA.

The Official Chinese Office Action for Application No. 201610067213.5 dated Dec. 26, 2018, 6 pages.

* cited by examiner

SYNCHRONIZATION METHOD AND DEVICE

CROSS-REFERENCE TO RELATED APPLICATIONS

This patent application is a U.S. National Phase application under 35 U.S.C. § 371 of International Application No. PCT/CN2017/070899, filed on Jan. 11, 2017, which claims the benefit and priority of Chinese Patent Application No. 201610067213.5, filed with the Chinese Patent Office on Jan. 29, 2016, and entitled "A Synchronization Method and Device," the entire contents of which was incorporated by reference.

FIELD

The present disclosure relates to the field of communications, and particularly to a synchronization method and device.

BACKGROUND

The Global Navigation Satellite System (GNSS) introduced into Vehicle-to-Vehicle (V2V) communication systems has led to more levels of synchronization precision in the V2V communication systems than in the Device to Device (D2D) systems. The timing can be referred from the base station to form a synchronization scheme, or the timing can be referred directly from the GNSS to form the synchronization scheme. However, currently there is neither a reasonable mechanism to assist a terminal in determining a scheme the terminal is in, nor a reasonable approach to assist the terminal in determining its own synchronization level and performing subsequent timing adjustment operations.

In a vehicle and road coordination system, information about vehicles and roads is obtained using technologies such as radio communication, and the information about vehicles and roads is exchanged and shared between vehicles, and between a vehicle and a road side device, so that the vehicles are coordinated intelligently and the vehicles cooperate with the infrastructure intelligently to optimize utilization of system resources, improve safety of traffic on the roads, and alleviate traffic jams. Such a system is a Vehicle-to-everything (V2X) system, in the broadest sense of the word, and is also an inevitable trend of future development of intelligent transportation.

Figure 1:
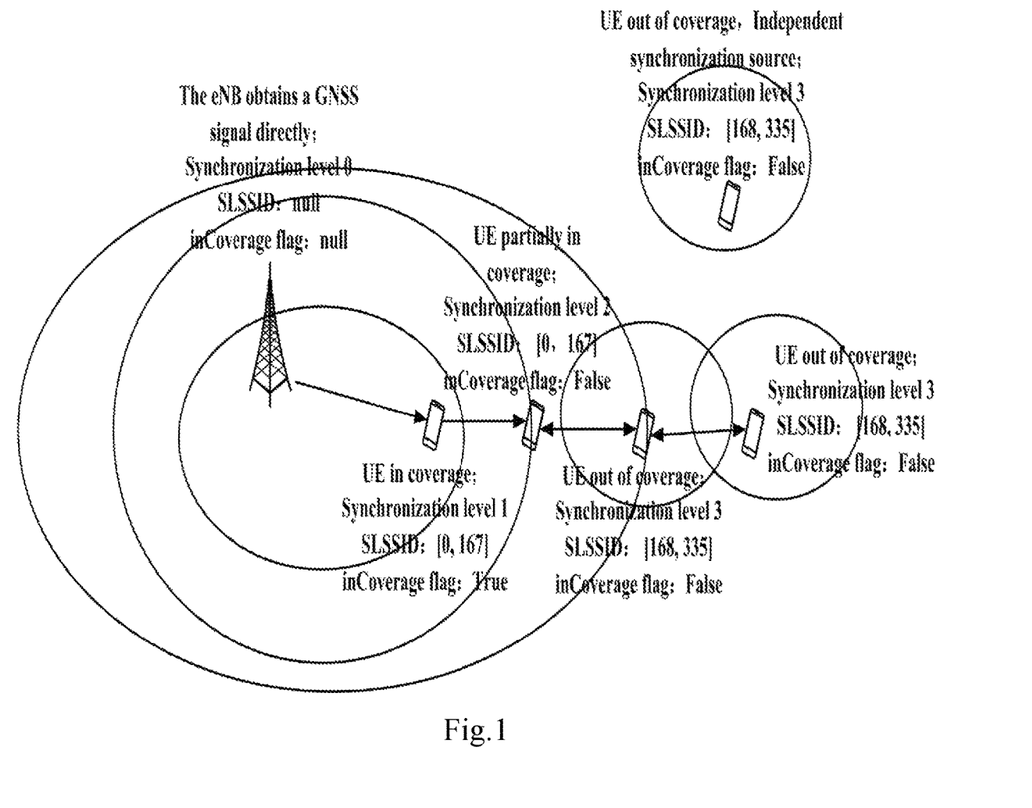
FIG. 1 is a schematic diagram of synchronization priorities and synchronization sequences in a Release 12 (R12) of an existing technology.

Standards of D2D communication established in researches on the 3rd Generation Partnership Project (3GPP) standards involve three synchronization levels in total. As illustrated in FIG. 1, a terminal in the coverage of a base station is at a level 1, a terminal partially in the coverage of the base station is at a level 2, and a terminal out of the coverage of the base station is at a level 3. The three levels are distinguished by Side Link Synchronization Signal (SLSS) sequences and values of an in-coverage flag, just as follows.

The terminal in the coverage of the base station transmits a synchronization sequence in an id_net set, and the value of the in-coverage flag is True. A synchronization sequence transmitted by the terminal partially in the coverage of the base station is the same as a sequence transmitted by synchronization reference User Equipment (UE) selected by the terminal, but the value of the in-coverage flag is False. Regarding the terminal out of the coverage of the base station, if synchronization reference UE selected by the terminal out of the coverage of the base station is a terminal partially in the coverage of the base station, then a value of a synchronization sequence transmitted by the terminal out of the coverage of the base station equals to a value of a synchronization sequence transmitted by the reference UE plus 168, and a value of the in-coverage flag is False; if the synchronization reference UE selected by the terminal out of the coverage of the base station is a terminal out of the coverage of the base station, then the synchronization sequence transmitted by the terminal out of the coverage of the base station is the same as the sequence transmitted by the selected reference UE, and the value of the in-coverage flag is False; and if the terminal out of the coverage of the base station does not select any synchronization reference UE, then it selects any one sequence in an id_oon set as its own synchronization sequence, and transmits the selected synchronization sequence, where the value of the in-coverage flag is False.

Communication over an internet of vehicles might have two synchronization schemes, i.e., a synchronization scheme whose timing refers from the GNSS, and a synchronization scheme whose timing refers from the base station. Apparently the D2D communication, whose timing refers from the base station, fails to take into account a UE synchronized with a GNSS but only transmits the timing of the base station to the terminals, thus unable to synchronize the V2X system.

SUMMARY

Embodiments of the disclosure provide a synchronization method and device so as to distinguish between synchronization schemes and synchronization levels of nodes in a V2V communication system to enable rapid synchronization in the V2V communication system.

An embodiment of the disclosure provides a synchronization method. The method includes: determining a synchronization priority of a node; and determining a synchronization sequence of the node and a value of a distinguishing flag of the node according to the synchronization priority of the node. The distinguishing flag indicates that the node belongs to a GNSS synchronization scheme or an evolved Node B (eNB) synchronization scheme.

In an embodiment, determining the synchronization priority of the node includes: determining that the synchronization priority of the node is a preset first priority, a preset second priority, a preset third priority, or a preset fourth priority.

In an embodiment, determining the synchronization sequence of the node and the value of the distinguishing flag of the node according to the synchronization priority of the node includes: when the synchronization priority of the node is the first priority, determining that the synchronization sequence of the node is a synchronization sequence in an id_net set excluding (X1-168) and (X2-168), and determining that the value of the distinguishing flag of the node is True; when the synchronization priority of the node is the second priority, determining that the synchronization sequence of the node is a synchronization sequence X1 in an id_oon set, and determining that the value of the distinguishing flag of the node is False; when the synchronization priority of the node is the third priority, determining that the synchronization sequence of the node is a synchronization sequence X2 in the id_oon set, and determining that the value of the distinguishing flag of the node is False; and when the synchronization priority of the node is the fourth priority, determining that the value of the distinguishing flag of the node is False, and determining the synchronization sequence of the node according to one of following schemes: in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168; in a second scheme, if the synchronization reference node of the node has the third priority, then the synchronization sequence of the node is set to be a fixed value X3; in a third scheme, if the synchronization reference node of the node has the fourth priority, then, if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node, where the value is not equal to X1 or X2.

In an embodiment, determining the synchronization sequence of the node and the value of the distinguishing flag of the node according to the synchronization priority of the node includes: when the synchronization priority of the node is the first priority, determining that the synchronization sequence of the node is a synchronization sequence in an id_net set excluding X1 and X2, and determining that the value of the distinguishing flag of the node is False; when the synchronization priority of the node is the second priority, determining that the synchronization sequence of the node is the synchronization sequence X1 in the id_net set, and determining that the value of the distinguishing flag of the node is True; when the synchronization priority of the node is the third priority, determining that the synchronization sequence of the node is the synchronization sequence X2 in the id_net, and determining that the value of the distinguishing flag of the node is True; and when the synchronization priority of the node is the fourth priority, determining that the value of the distinguishing flag of the node is True, and determining the synchronization sequence of the node according to one of following schemes: in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in an id_oon set, and the synchronization sequence of the node equals to the synchronization sequence of the synchronization reference node plus 168; in a second scheme, if the synchronization reference node of the node has the third priority, then the synchronization sequence of the node is a synchronization sequence in the id_oon set, and the synchronization sequence of the node equals to a fixed value of (X2+168); in a third scheme, if the synchronization reference node of the node has the fourth priority, then, if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node.

In an embodiment, when the synchronization priority of the node is the first priority, the synchronization sequence of the node is configured by the eNB via system information.

An embodiment of the disclosure provides another synchronization device. The device includes a processor configured to read a program in a memory to perform: determining a synchronization priority of a node; and determining a synchronization sequence of the node and a value of a distinguishing flag of the node according to the synchronization priority of the node. The distinguishing flag indicates that the node belongs to a GNSS synchronization scheme or an eNB synchronization scheme.

In an embodiment, the processor is further configured to perform: determining that the synchronization priority of the node is a preset first priority, a preset second priority, a preset third priority, or a preset fourth priority.

In an embodiment, the processor is further configured to perform: when the synchronization priority of the node is the first priority, determining that the synchronization sequence of the node is a synchronization sequence in an id_net set excluding (X1-168) and (X2-168), and determining that the value of the distinguishing flag of the node is True; when the synchronization priority of the node is the second priority, determining that the synchronization sequence of the node is a synchronization sequence X1 in an id_oon set, and determining that the value of the distinguishing flag of the node is False; when the synchronization priority of the node is the third priority, determining that the synchronization sequence of the node is a synchronization sequence X2 in the id_oon set, and determining that the value of the distinguishing flag of the node is False; and when the synchronization priority of the node is the fourth priority, determining that the value of the distinguishing flag of the node is False, and determining the synchronization sequence of the node according to one of following schemes: in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168; in a second scheme, if the synchronization reference node of the node has the third priority, then the synchronization sequence of the node is set to be a fixed value X3; in a third scheme, if the synchronization reference node of the node has the fourth priority, then, if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node, where the value is not equal to X1 or X2.

In an embodiment, the processor is further configured to perform: when the synchronization priority of the node is the first priority, determining that the synchronization sequence of the node is a synchronization sequence in an id_net set excluding X1 and X2, and determining that the value of the distinguishing flag of the node is False; when the synchronization priority of the node is the second priority, determining that the synchronization sequence of the node is the synchronization sequence X1 in the id_net set, and determining that the value of the distinguishing flag of the node is True; when the synchronization priority of the node is the third priority, determining that the synchronization sequence of the node is the synchronization sequence X2 in the id_net, and determining that the value of the distinguishing flag of the node is True; and when the synchronization priority of the node is the fourth priority, determining that the value of the distinguishing flag of the node is True, and determining the synchronization sequence of the node according to one of following schemes: in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in an id_oon set, and the synchronization sequence of the node equals to the synchronization sequence of the synchronization reference node plus 168; in a second scheme, if the synchronization reference node of the node has the third priority, then the synchronization sequence of the node is a synchronization sequence in the id_oon set, and the synchronization sequence of the node equals to a fixed value of (X2+168); in a third scheme, if the synchronization reference node of the node has the fourth priority, then, if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node.

In an embodiment, when the synchronization priority of the node is the first priority, the synchronization sequence of the node, determined by the processor, is configured by the eNB via system information.

DETAILED DESCRIPTION OF THE EMBODIMENTS

Embodiments of the disclosure provide a synchronization method and device so as to distinguish between synchronization schemes and synchronization levels of nodes in V2V communication.

The technical solutions according to the embodiments of the disclosure are generally intended to distinguish between synchronization schemes and synchronization levels of nodes in V2V communication. Possible synchronization levels in a V2V synchronization scheme include Priority 1a, Priority 1, Priority 2, and Priority 3. A distinguishing flag is introduced herein to indicate whether a system's timing refers from timing of a base station or from a GNSS. In order to be consistent with the D2D standards, the in-coverage flag is used as the distinguishing flag, so values of the in-coverage flag according to the embodiments of the disclosure indicate something different from what values of the in-coverage flag in the D2D system indicate. According to the embodiments of the disclosure, methods for distinguishing between the synchronization schemes and synchronization levels of nodes in V2V communication include the following two approaches.

First Approach

Priority 1a: an SLSS identifier (ID) of a node at Priority 1a is selected from the id_net set excluding (X1-168) and (X2-168) and is configured by an eNB via system information. The value of the in-coverage flag is True.

Priority 1: an SLSS ID of a node at Priority 1 is selected from the id_oon set and is set to be the fixed value X1. The value of the in-coverage flag is set to False.

Priority 2: an SLSS ID of a node at Priority 2 is selected from the id_oon set and is set to the fixed value X2. The value of the in-coverage flag is set to False.

Priority 3: the value of the in-coverage flag of a node at Priority 3 is set to False, and an SLSS ID of the node at Priority 3 depends on the synchronization reference UE according to one of the following schemes.

In a first scheme, the synchronization reference UE of the node at Priority 3 is a node at Priority 1a, then, a synchronization sequence of the node at Priority 3 is the same as a synchronization sequence of the node at Priority 1a; or, a value of the synchronization sequence of the node at Priority 3 equals to an SLSS ID of the node at Priority 1a plus 168.

In a second scheme, the synchronization reference UE of the node at Priority 3 is a node at Priority 2, then the synchronization sequence of the node at Priority 3 is set to be a fixed value X3.

In a third scheme, the synchronization reference UE of the node at Priority 3 is a node at Priority 3, then: if the SLSS ID of the synchronization reference UE of the node at Priority 3 belongs to the id_net set, then the value of the synchronization sequence of the node at Priority 3 equals to the ID of the synchronization sequence of the synchronization reference UE, plus 168 plus 168; or, if the SLSS of the synchronization reference UE of the node at Priority 3 belongs to the id_oon set, then the value of the synchronization sequence of the node at Priority 3 is the same as the SLSS ID of the synchronization reference UE.

In a fourth scheme, the node at Priority 3 operates as an independent synchronization source and selects in a uniform distribution a value randomly in the range [168, 335] excluding X1 and X2 as the value of the synchronization sequence of the node at Priority 3.

Second Approach

Priority 1a: an SLSS ID of a node at Priority 1a is selected from the id_net set excluding X1 and X2 and is configured by an eNB via system information. The value of the in-coverage flag is False.

Priority 1: a synchronization sequence of a node at Priority 1 is selected from the id_net sequence, and is set to be the fixed value X1, and the value of the in-coverage flag is set to True.

Priority 2: a synchronization sequence of a node at Priority 2 is selected from the id_net sequence, and is set to be the fixed value X2, and the value of the in-coverage flag is set to True.

Priority 3: the in-coverage flag of a node at Priority 3 is set to True, and a synchronization sequence of the node at Priority 3 depends on the synchronization reference UE of the node at Priority 3 according to one of the following schemes.

In a first scheme, the synchronization reference UE of the node at Priority 3 is a node at Priority 1a, then: the synchronization sequence of the node at Priority 3 is selected from the id_net set, and the synchronization sequence of the node at Priority 3 is the same sequence as a synchronization sequence of the node at Priority 1a; or, the synchronization sequence of the node at Priority 3 is selected from the id_oon set, and the value of the synchronization sequence of the node at Priority 3 equals to the ID of the synchronization sequence of the node at Priority 1a plus 168.

In a second scheme, the synchronization reference UE of the node at Priority 3 is a node at Priority 2, and the synchronization sequence of the node at Priority 3 is selected from the id_oon sequence, and is particularly selected as a synchronization sequence having the value of X2+168.

In a third scheme, the synchronization reference UE of the node at Priority 3 is a node at Priority 3, then: if an SLSS of the synchronization reference UE at Priority 3, received by the node at Priority 3, belongs to the id_net set, the synchronization sequence of the node at Priority 3 is selected from the id_oon set, and the value of the synchronization sequence of the node at Priority 3 equals to the ID of the synchronization sequence of the synchronization reference UE at Priority 3 plus 168; or, if the SLSS of the synchronization reference UE of the node at Priority 3 belongs to the id_oon set, the synchronization sequence of the node at Priority 3 is the same as the received SLSS ID of the synchronization reference UE at Priority 3.

In a fourth scheme, the node at Priority 3 operates as an independent synchronization source and selects in a uniform distribution a value randomly in the range [168, 335] of the id_oon set as the synchronization sequence of the independent synchronization source.

Figure 2:
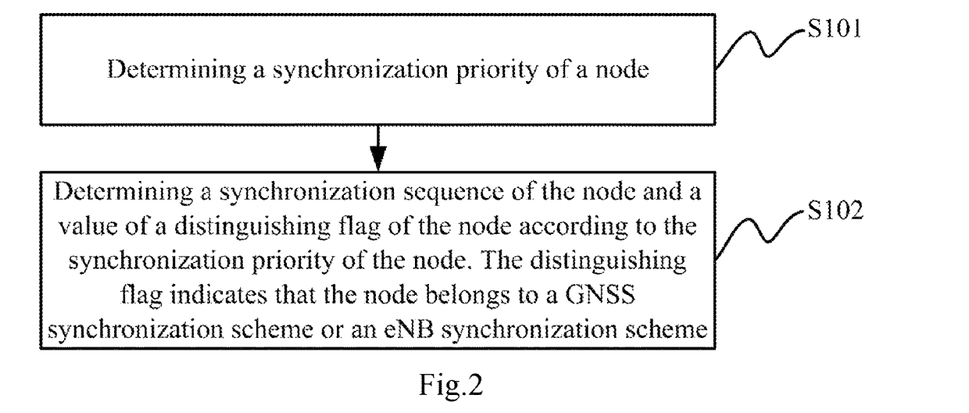
FIG. 2 is a schematic flow chart of a synchronization method according to an embodiment of the disclosure.

In summary, referring to FIG. 2, a synchronization method according to an embodiment of the disclosure includes the following operations.

S101: determining a synchronization priority of a node.

S102: determining a synchronization sequence of the node and a value of a distinguishing flag of the node according to the synchronization priority of the node. The distinguishing flag indicates that the node belongs to a GNSS synchronization scheme or an eNB synchronization scheme.

In an embodiment, determining the synchronization priority of the node includes: determining that the synchronization priority of the node is a preset first priority, a preset second priority, a preset third priority, or a preset fourth priority.

In an embodiment, determining the synchronization sequence of the node and the value of the distinguishing flag of the node according to the synchronization priority of the node includes: when the synchronization priority of the node is the first priority, determining that the synchronization sequence of the node is a synchronization sequence in an id_net set excluding (X1-168) and (X2-168), and determining that the value of the distinguishing flag of the node is True; when the synchronization priority of the node is the second priority, determining that the synchronization sequence of the node is a synchronization sequence X1 in an id_oon set, and determining that the value of the distinguishing flag of the node is False; when the synchronization priority of the node is the third priority, determining that the synchronization sequence of the node is a synchronization sequence X2 in the id_oon set, and determining that the value of the distinguishing flag of the node is False; and when the synchronization priority of the node is the fourth priority, determining that the value of the distinguishing flag of the node is False, and determining the synchronization sequence of the node according to one of following schemes: in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168; in a second scheme, if the synchronization reference node of the node has the third priority, then the synchronization sequence of the node is set to be a fixed value X3; in a third scheme, if the synchronization reference node of the node has the fourth priority, then, if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node, where the value is not equal to X1 or X2.

In an embodiment, determining the synchronization sequence of the node and the value of the distinguishing flag of the node according to the synchronization priority of the node includes: when the synchronization priority of the node is the first priority, determining that the synchronization sequence of the node is a synchronization sequence in an id_net set excluding X1 and X2, and determining that the value of the distinguishing flag of the node is False; when the synchronization priority of the node is the second priority, determining that the synchronization sequence of the node is the synchronization sequence X1 in the id_net set, and determining that the value of the distinguishing flag of the node is True; when the synchronization priority of the node is the third priority, determining that the synchronization sequence of the node is the synchronization sequence X2 in the id_net, and determining that the value of the distinguishing flag of the node is True; and when the synchronization priority of the node is the fourth priority, determining that the value of the distinguishing flag of the node is True, and determining the synchronization sequence of the node according to one of following schemes: in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in an id_oon set, and the synchronization sequence of the node equals to the synchronization sequence of the synchronization reference node plus 168; in a second scheme, if the synchronization reference node of the node has the third priority, then the synchronization sequence of the node is a synchronization sequence in the id_oon set, and the synchronization sequence of the node equals to a fixed value of (X2+168); in a third scheme, if the synchronization reference node of the node has the fourth priority, then, if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node.

In an embodiment, when the synchronization priority of the node is the first priority, the synchronization sequence of the node is configured by the eNB via system information.

Several embodiments are described below as examples.

A First Embodiment Relating to GNSS or GNSS-Equivalent Based Synchronization

Figure 3:
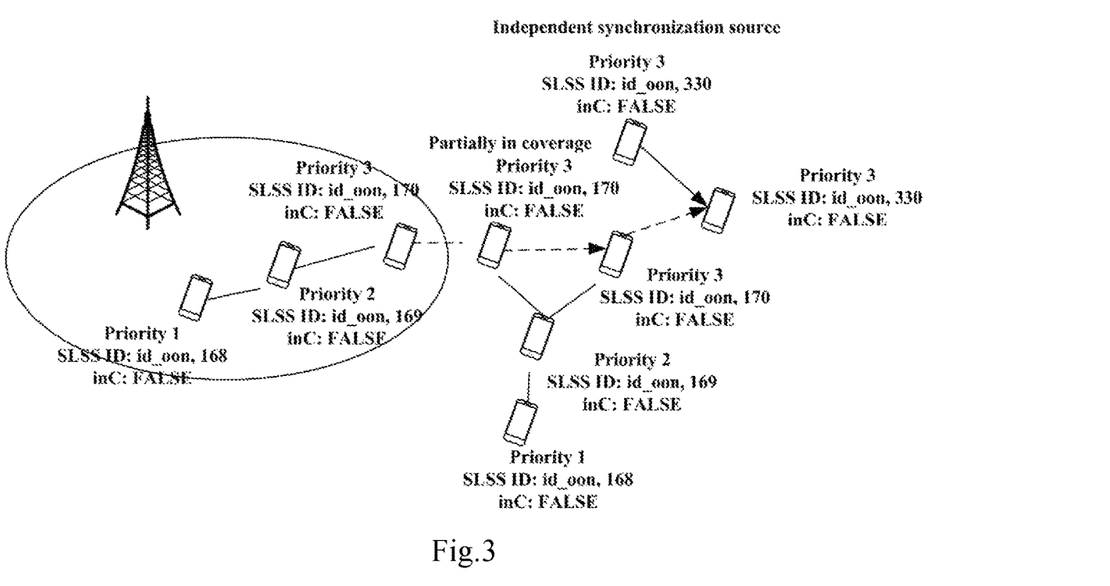
FIG. 3 is a schematic diagram of an example of setting a synchronization sequence and an in-coverage flag in GNSS or GNSS-equivalent based synchronization according to an embodiment of the disclosure.

FIG. 3 illustrates a particular implementation of the first embodiment. Since the synchronization priorities of GNSS or GNSS-equivalent based synchronization are independent of network coverage conditions, the in-coverage flag does not need to indicate "in coverage", "partially in coverage", or "out of coverage", and the value of the in-coverage flag is set to False to indicate GNSS or GNSS-equivalent based synchronization.

The three synchronization priorities need to be distinguished from each other by using an SLSS, and in order to reuse the SLSS design of D2D in the R12 as much as possible, the SLSS can be set as follows.

For a node at Priority 1, an SLSS ID is selected from the id_oon sequence and is set to be the fixed value X1, and the value of the in-coverage flag is set to False.

For a node at Priority 2, the SLSS ID is selected from the id_oon sequence and is set to be the fixed value X2, and the value of the in-coverage flag is set to False.

For a node at Priority 3, the value of the in-coverage flag is set to False, and the SLSS ID is selected from the id_oon sequence. The SISS ID is set according to the synchronization reference UE as follows.

When the synchronization reference UE is a node at Priority 2, the SLSS ID is selected from the id_oon sequence, and is set to be the fixed value X3.

When the synchronization reference UE is a node at Priority 3, the SLSS ID is the same as the ID of a received SLSS of the synchronization reference UE at Priority 3.

When the node at Priority 3 operates as an independent synchronization source, a uniformly distributed value in the range of id_oon is selected randomly in the range [168, 335] as a synchronization sequence of the independent synchronization source.

A Second Embodiment Relating to eNB Based Synchronization

Figure 4:
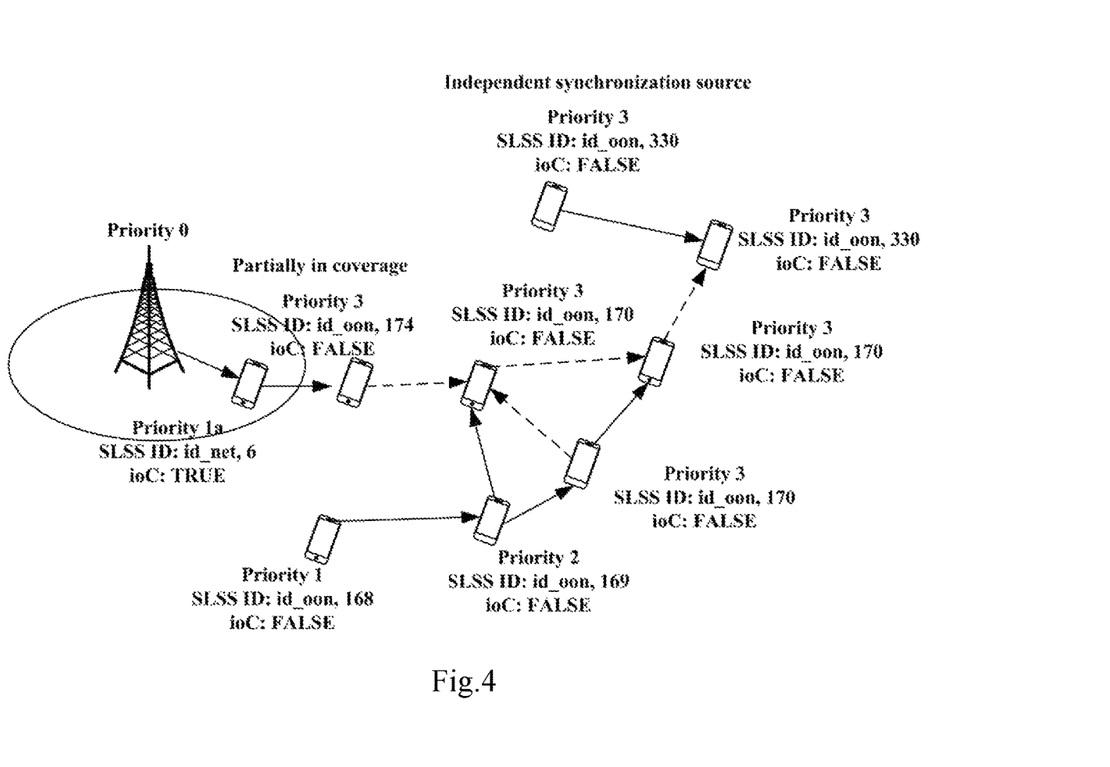
FIG. 4 is a schematic diagram of an example of setting a synchronization sequence and the value of an in-coverage flag in eNB based synchronization according to an embodiment of the disclosure.

FIG. 4 illustrates an implementation of the second embodiment. Nodes in an eNB based synchronization scheme have four priorities, where the value of the in-coverage flag of a node at Priority 1, 2, or 3 is set in the same way as the value of the in-coverage flag of a node at Priority 1, 2, or 3 in GNSS or GNSS-equivalent synchronization is set according to the first embodiment.

An SLSS ID of a node at Priority 1a is selected from the id_net set excluding (X1-168) and (X2-168), and is configured by an eNB via system information, and the value of the in-coverage flag is set to True.

An SLSS ID of a node at Priority 1 or at Priority 2 is set in the same way as an SLSS ID in GNSS or GNSS-equivalent synchronization according to the first embodiment.

For a node at Priority 3, when a synchronization reference UE is a node at Priority 1a, the SLSS ID of the node at Priority 3 equals to the ID of a synchronization sequence of the synchronization reference node at Priority 1a plus 168; or, when the synchronization reference UE is a node at Priority 2, the SLSS ID of the node at Priority 3 is selected from the id_oon sequence and is set to be the fixed value X3, and the value of the in-coverage flag is set to False; or, when the synchronization reference UE is a node at Priority 3, and an SLSS thereof belongs to the id_oon set, an SLSS ID of the node at Priority 3 equals to the received SLSS ID of the synchronization reference UE at Priority 3; or, when the node operates as an independent synchronization source, a uniformly distributed value in the range of id_oon is selected randomly in the range [168, 335] as a synchronization sequence of the independent synchronization source.

A Third Embodiment Relating to eNB Based Synchronization

Figure 5:
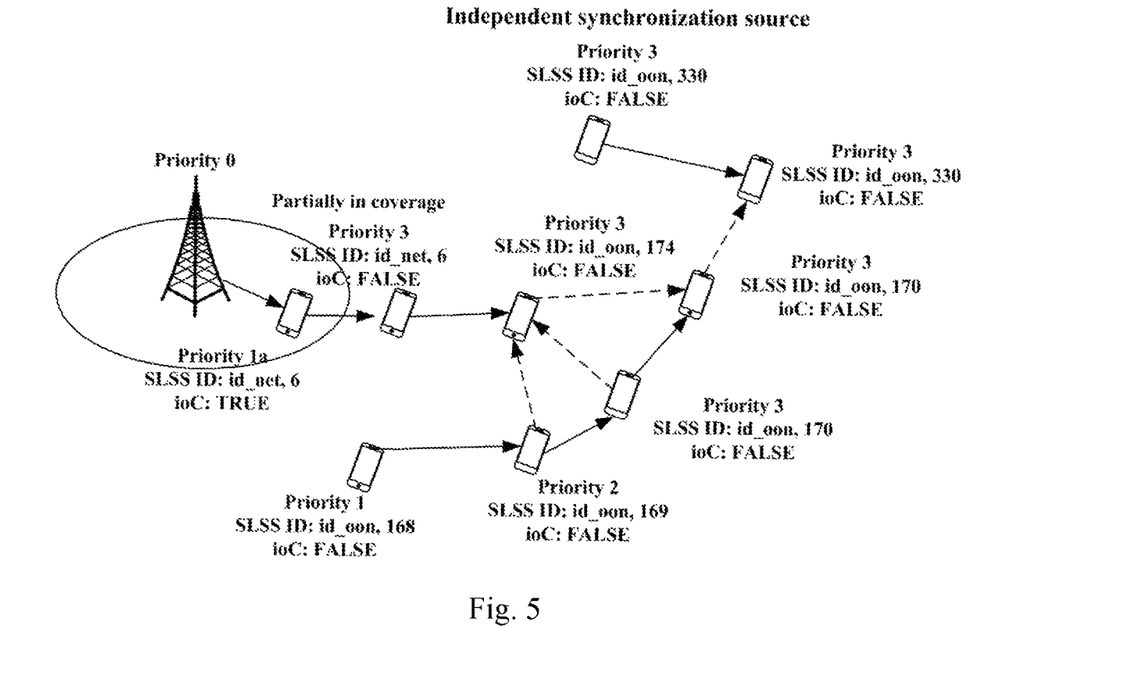
FIG. 5 is a schematic diagram of an example of setting a synchronization sequence and the value of an in-coverage flag in eNB based synchronization according to an embodiment of the disclosure.

FIG. 5 illustrates an implementation of the third embodiment. Nodes in eNB based synchronization have four priorities, where the value of the in-coverage flag of a node at Priority 1, 2, or 3 is set in the same way as the value of the in-coverage flag of a node at Priority 1, 2, or 3 in GNSS or GNSS-equivalent synchronization is set according to the first embodiment.

An SLSS ID of a node at Priority 1a is selected from the id_net set excluding (X1-168) and (X2-168) and is configured by an eNB via system information, and the value of the in-coverage flag is set to True.

An SLSS ID of a node at Priority 1 or Priority 2 is set in the same way as an SLSS ID in GNSS or GNSS-equivalent synchronization according to the first embodiment.

For a node at Priority 3, when a synchronization reference UE of the node at Priority 3 is a node at Priority 1a, the node at Priority 3 selects its synchronization sequence from the id_net set, where the synchronization sequence of the node at Priority 3 is the same as a synchronization sequence of the node at Priority 1a; or, when the synchronization reference UE of the node at Priority 3 is a node at Priority 2, the node at Priority 3 selects the synchronization sequence from the id_oon sequence, where the synchronization sequence of the node at Priority 3 is set to be the fixed value X3, and the value of the in-coverage flag is set to False; or, when the synchronization reference UE of the node at Priority 3 is a node at Priority 3, and an SLSS thereof belongs to the id_net set, the value of the synchronization sequence selected by the node at Priority 3 equals to the ID of a synchronization sequence of the synchronization reference UE plus 168; or, when the node operates as an independent synchronization source, a uniformly distributed value in the range of id_oon is selected randomly in the range [168, 335] as a synchronization sequence of the independent synchronization source.

Fourth Embodiment

Figure 6:
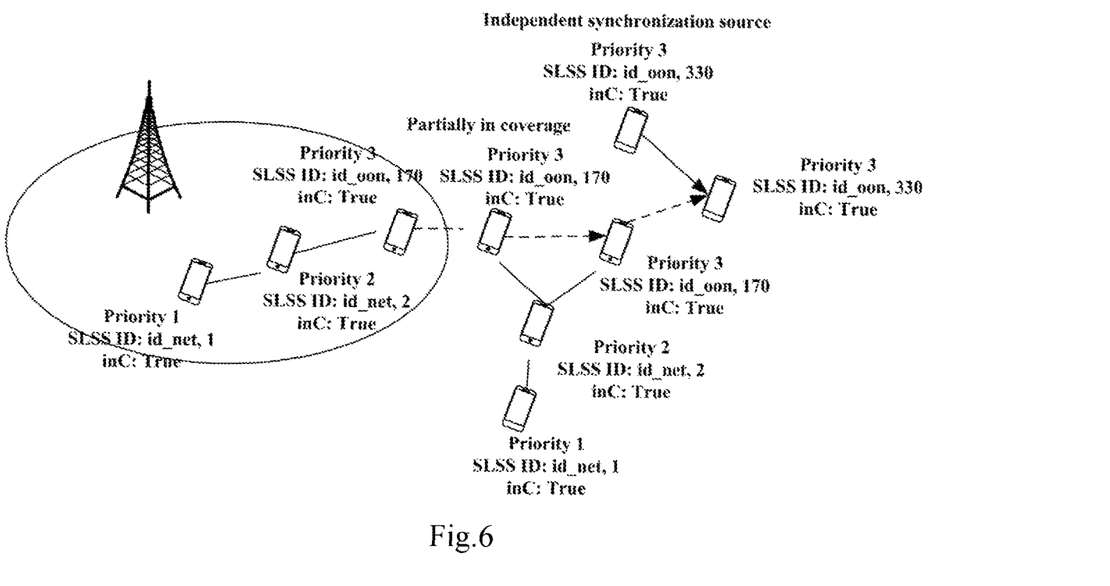
FIG. 6 is a schematic diagram of an example of setting a synchronization sequence and the value of an in-coverage flag in GNSS or GNSS-equivalent based synchronization according to an embodiment of the disclosure.

FIG. 6 illustrates an implementation of the fourth embodiment. The three synchronization priorities need to be distinguished from each other using an SLSS, and in order to reuse the SLSS design of D2D in the R12 as much as possible, the SLSS can be set as follows.

For a node at Priority 1, the synchronization sequence is selected from the id_net sequence and is set to be the fixed value X1, and the value of the in-coverage flag is set to True.

For a node at Priority 2, the synchronization sequence is selected from the id_net sequence and is set to be the fixed value X2, and the value of the in-coverage flag is set to True.

For a node at Priority 3, the value of the in-coverage flag is set to True. The synchronization sequence is selected from the id_oon sequence, and is set as follows according to the synchronization reference UE: when the synchronization reference UE is a node at Priority 2, the synchronization sequence having the value of X2+168 is selected as the synchronization sequence of the node at Priority 3; or, when the synchronization reference UE is a node at Priority 3, the synchronization sequence selected as the synchronization sequence of the node at Priority 3 is the same as a received SLSS ID of the synchronization reference UE at Priority 3; or, when the node operates as an independent synchronization source, a uniformly distributed value in the range of id_oon is selected randomly in the range [168, 335] as a synchronization sequence of the independent synchronization source.

Fifth Embodiment

Figure 7:
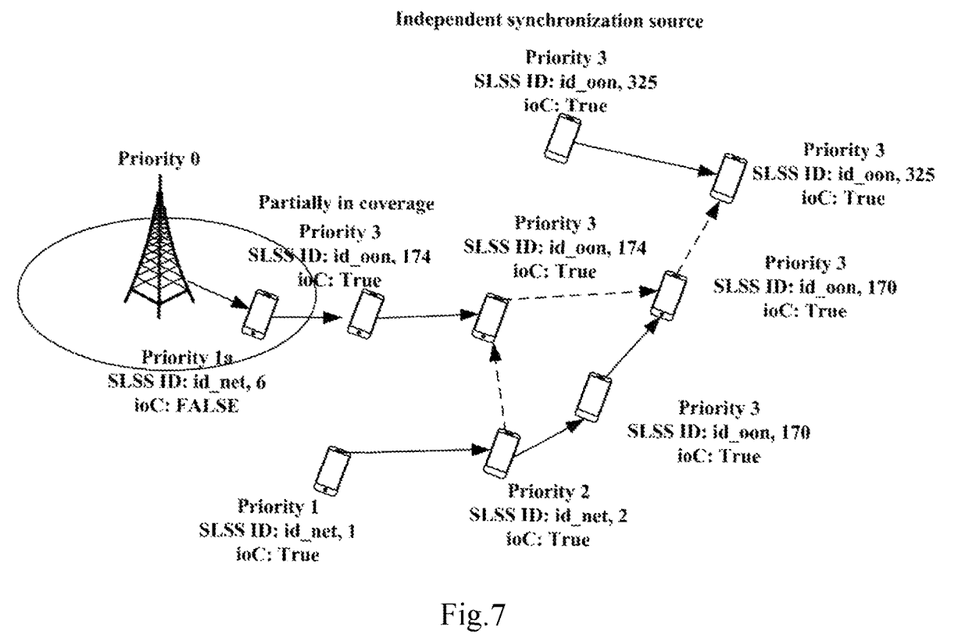
FIG. 7 is a schematic diagram of an example of setting a synchronization sequence and the value of an in-coverage flag in eNB based synchronization according to an embodiment of the disclosure.

FIG. 7 illustrates an implementation of the fifth embodiment. Nodes in eNB based synchronization have four priorities, where the value of the in-coverage flag of a node at Priority 1, 2, or 3 is set in the same way as the value of the in-coverage flag of a node at Priority 1, 2, or 3 in GNSS or GNSS-equivalent synchronization is set according to the fourth embodiment.

An SLSS ID of a node at Priority 1a is selected from id_net excluding X1 and X2 and is configured by an eNB via system information, and the value of the in-coverage flag is set to False.

An SLSS ID of a node at Priority 1 or Priority 2 is set in the same way as an SLSS ID in GNSS or GNSS-equivalent synchronization according to the fourth embodiment, and the value of the in-coverage flag is set to True.

For a node at Priority 3, the value of the in-coverage flag is set to True, and the synchronization sequence of the node at Priority 3 is determined as follows: when the synchronization reference UE is a node at Priority 1a, the SLSS ID of the node at Priority 3 equals to the ID of a synchronization sequence of the synchronization reference node at Priority 1a plus 168; or, when the synchronization reference UE is a node at Priority 2, the synchronization sequence having the value of X2+168 is selected as the synchronization sequence of the node at Priority 3; or, when the synchronization reference UE is a node at Priority 3, and an SLSS thereof belongs to the id_oon set, the synchronization sequence of the node at Priority 3 is the same as the received SLSS ID of the UE at Priority 3; or, when the node operates as an independent synchronization source, a uniformly distributed value in the range of id_oon is selected randomly in the range [168, 335] as the synchronization sequence of the independent synchronization source.

Sixth Embodiment

Figure 8:
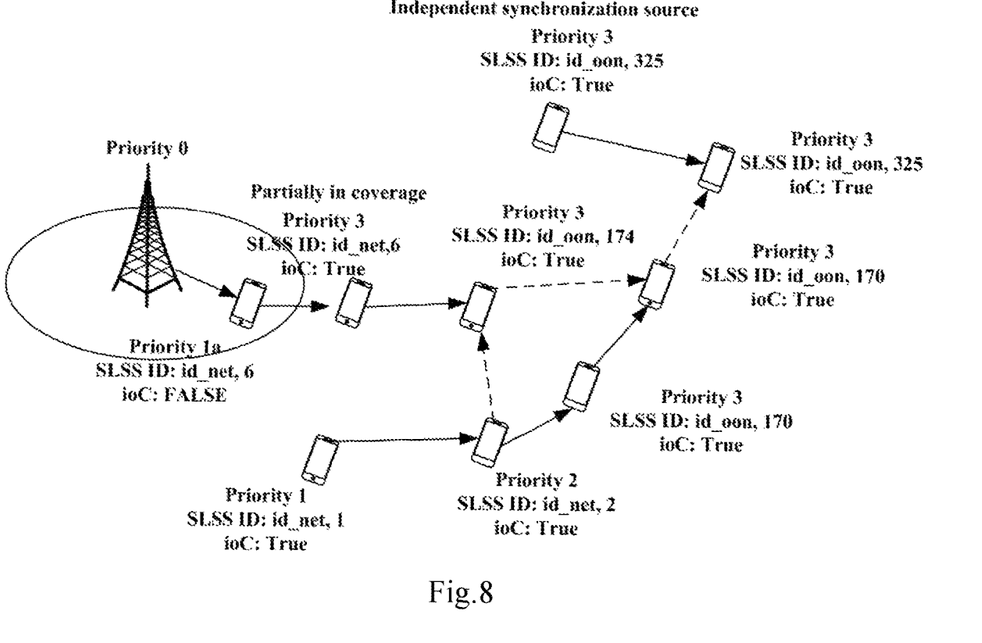
FIG. 8 is a schematic diagram of an example of setting a synchronization sequence and the value of an in-coverage flag in eNB based synchronization according to an embodiment of the disclosure.

FIG. 8 illustrates an implementation of the sixth embodiment. Nodes in eNB based synchronization has four priorities, where the value of the in-coverage flag of a node at Priority 1, 2, or 3 is set in the same way as the value of the in-coverage flag of a node at Priority 1, 2, or 3 in GNSS or GNSS-equivalent synchronization is set according to the fourth embodiment.

An SLSS ID of a node at Priority 1a is selected from id_net excluding X1 and X2 and is configured by an eNB via system information, and the value of the in-coverage flag is set to False.

An SLSS ID of a node at Priority 1 or Priority 2 is set in the same way as an SLSS ID in GNSS or GNSS-equivalent synchronization according to the fourth embodiment, and the value of the in-coverage flag is set to True.

For a node at Priority 3, the value of the in-coverage flag is set to True, and the synchronization sequence of the node at Priority 3 is determined as follows: when the synchronization reference UE is a node at Priority 1a, the synchronization sequence of the node at Priority 3 is selected from id_net, and the synchronization sequence of the node at Priority 3 is the same sequence as the synchronization sequence of the synchronization reference node at Priority 1a; or, when the synchronization reference UE is a node at Priority 2, the synchronization sequence having the value of X2+168 is selected as the synchronization sequence of the node at Priority 3; or, when the synchronization reference UE is a node at Priority 3, and an SLSS of the synchronization reference UE belongs to the id_net set, the synchronization sequence of the node at Priority 3 is selected from the id_oon set, and the value of the synchronization sequence of the node at Priority 3 equals to the ID of the synchronization sequence of the synchronization reference UE at Priority 3 plus 168; or, when the node operates as an independent synchronization source, a uniformly distributed value in the range of id_oon is selected randomly in the range [168, 335] as the synchronization sequence of the independent synchronization source.

Figure 9:
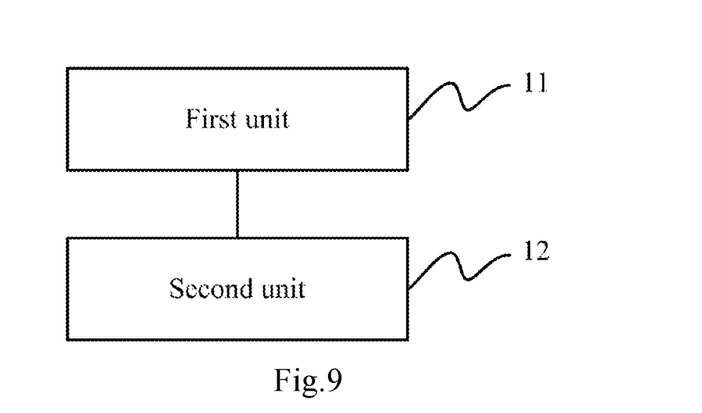
FIG. 9 is a schematic structural diagram of a synchronization device according to an embodiment of the disclosure.

In correspondence to the method above, FIG. 9 illustrates a synchronization device according to an embodiment of the disclosure. The synchronization device includes: a first unit 11 configured to determine a synchronization priority of the node; and a second unit 12 configured to determine a synchronization sequence of the node and a value of a distinguishing flag of the node according to the synchronization priority of the node. The distinguishing flag indicates that the node belongs to a GNSS synchronization scheme or an eNB synchronization scheme.

In an embodiment, the first unit is configured to determine that the synchronization priority of the node is a preset first priority, a preset second priority, a preset third priority, or a preset fourth priority.

In an embodiment, the second unit is configured to: when the synchronization priority of the node is the first priority, determine that the synchronization sequence of the node is a synchronization sequence in an id_net set excluding (X1-168) and (X2-168), and determine that the value of the distinguishing flag of the node is True; when the synchronization priority of the node is the second priority, determine that the synchronization sequence of the node is a synchronization sequence X1 in an id_oon set, and determine that the value of the distinguishing flag of the node is False; when the synchronization priority of the node is the third priority, determine that the synchronization sequence of the node is a synchronization sequence X2 in the id_oon set, and determine that the value of the distinguishing flag of the node is False; and when the synchronization priority of the node is the fourth priority, determine that the value of the distinguishing flag of the node is False, and determine the synchronization sequence of the node according to one of following schemes: in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168; in a second scheme, if the synchronization reference node of the node has the third priority, then the synchronization sequence of the node is set to be a fixed value X3; in a third scheme, if the synchronization reference node of the node has the fourth priority, then, if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node, where the value is not equal to X1 or X2.

In an embodiment, the second unit is configured to: when the synchronization priority of the node is the first priority, determine that the synchronization sequence of the node is a synchronization sequence in an id_net set excluding X1 and X2, and determine that the value of the distinguishing flag of the node is False; when the synchronization priority of the node is the second priority, determine that the synchronization sequence of the node is the synchronization sequence X1 in the id_net set, and determine that the value of the distinguishing flag of the node is True; when the synchronization priority of the node is the third priority, determine that the synchronization sequence of the node is the synchronization sequence X2 in the id_net, and determine that the value of the distinguishing flag of the node is True; and when the synchronization priority of the node is the fourth priority, determine that the value of the distinguishing flag of the node is True, and determine the synchronization sequence of the node according to one of following schemes: in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in an id_oon set, and the synchronization sequence of the node equals to the synchronization sequence of the synchronization reference node plus 168; in a second scheme, if the synchronization reference node of the node has the third priority, then the synchronization sequence of the node is a synchronization sequence in the id_oon set, and the synchronization sequence of the node equals to a fixed value of (X2+168); in a third scheme, if the synchronization reference node of the node has the fourth priority, then, if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node.

In an embodiment, when the synchronization priority of the node is the first priority, the synchronization sequence of the node, determined by the second unit, is configured by the eNB via system information.

Figure 10:
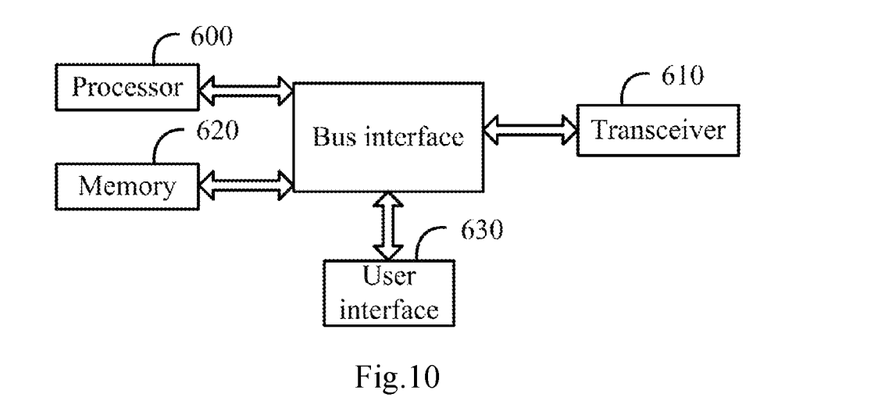
FIG. 10 is a schematic structural diagram of another synchronization device according to an embodiment of the disclosure.

Referring to FIG. 10, another synchronization device according to an embodiment of the disclosure includes: a processor 600 configured to read and execute program in a memory 620 to perform: determining a synchronization priority of a node; and determining a synchronization sequence of the node and a value of a distinguishing flag of the node according to the synchronization priority of the node. The distinguishing flag indicates that the node belongs to a GNSS synchronization scheme or an eNB synchronization scheme.

In an embodiment, the processor 600 is configured to determine the synchronization priority of the node includes:

determining that the synchronization priority of the node is a preset first priority, a preset second priority, a preset third priority, or a preset fourth priority.

In an embodiment, the processor 600 is configured to determine the synchronization sequence of the node and the value of the distinguishing flag of the node according to the synchronization priority of the node includes: when the synchronization priority of the node is the first priority, determining that the synchronization sequence of the node is a synchronization sequence in an id_net set excluding (X1-168) and (X2-168), and determining that the value of the distinguishing flag of the node is True; when the synchronization priority of the node is the second priority, determining that the synchronization sequence of the node is a synchronization sequence X1 in an id_oon set, and determining that the value of the distinguishing flag of the node is False; when the synchronization priority of the node is the third priority, determining that the synchronization sequence of the node is a synchronization sequence X2 in the id_oon set, and determining that the value of the distinguishing flag of the node is False; and when the synchronization priority of the node is the fourth priority, determining that the value of the distinguishing flag of the node is False, and determining the synchronization sequence of the node according to one of following schemes: in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168; in a second scheme, if the synchronization reference node of the node has the third priority, then the synchronization sequence of the node is set to be a fixed value X3; in a third scheme, if the synchronization reference node of the node has the fourth priority, then, if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node, where the value is not equal to X1 or X2.

In an embodiment, the processor 600 configured to determine the synchronization sequence of the node and the value of the distinguishing flag of the node according to the synchronization priority of the node includes: when the synchronization priority of the node is the first priority, determining that the synchronization sequence of the node is a synchronization sequence in an id_net set excluding X1 and X2, and determining that the value of the distinguishing flag of the node is False; when the synchronization priority of the node is the second priority, determining that the synchronization sequence of the node is the synchronization sequence X1 in the id_net set, and determining that the value of the distinguishing flag of the node is True; when the synchronization priority of the node is the third priority, determining that the synchronization sequence of the node is the synchronization sequence X2 in the id_net, and determining that the value of the distinguishing flag of the node is True; and when the synchronization priority of the node is the fourth priority, determining that the value of the distinguishing flag of the node is True, and determining the synchronization sequence of the node according to one of following schemes: in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in an id_oon set, and the synchronization sequence of the node equals to the synchronization sequence of the synchronization reference node plus 168; in a second scheme, if the synchronization reference node of the node has the third priority, then the synchronization sequence of the node is a synchronization sequence in the id_oon set, and the synchronization sequence of the node equals to a fixed value of (X2+168); in a third scheme, if the synchronization reference node of the node has the fourth priority, then, if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and in a fourth scheme, if the node operates as an independent synchronization source, then a value not smaller than 168 and not greater than 335 is randomly selected as the synchronization sequence of the node.

In an embodiment, when the synchronization priority of the node is the first priority, the processor 600 is configured to determine that the synchronization sequence of the node is configured by an eNB via system information.

The synchronization device also includes a transceiver 60 configured to receive and transmit data under the control of the processor 600.

Here in FIG. 10, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different user equipments, the user interface 630 can also be an interface via which device(s) is connected externally and/or internally, where the connected device(s) includes but is not be limited to a keypad, a display, a loudspeaker, a microphone, a joystick, etc.

The processor 600 is responsible for managing the bus architecture and performing normal processes, and the memory 620 can store data for use by the processor 600 in performing operations.

The processor 600 can be a Central Processing Unit (CPU), an Application Specific Integrated Circuit (ASIC), a Field-Programmable Gate Array (FPGA), or a Complex Programmable Logic Device (CPLD).

In summary, the embodiments of the disclosure provide a synchronization method and device so as to distinguish between synchronization schemes and synchronization levels of nodes in a V2V system, where this method is compatible with both a synchronization scheme whose timing refers from a GNSS or a synchronization scheme whose timing refers from an eNB, and brings minor modification to the existing standards, so that a terminal can distinguish between the different synchronization levels to enable rapid synchronization in the V2V communication system.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A synchronization method, comprising:
determining a synchronization priority of a node; and
determining a synchronization sequence of the node and
a value of a distinguishing flag of the node according to
the synchronization priority of the node, wherein the
distinguishing flag indicates that the node belongs to a
Global Navigation Satellite System (GNSS) synchronization scheme or an evolved Node B (eNB) synchronization scheme;
wherein determining the synchronization priority of the node comprises:
determining that the synchronization priority of the node is a preset first priority, a preset second priority, a preset third priority, or a preset fourth priority;
wherein determining the synchronization sequence of the node and the value of the distinguishing flag of the node according to the synchronization priority of the node comprises:
when the synchronization priority of the node is the first priority, determining that the synchronization sequence of the node is a synchronization sequence in a set of in-network side link synchronization signal (SLSS) identifiers (id_net set), the id_net set excluding (X1-168) and (X2-168), and determining that the value of the distinguishing flag of the node is True;
when the synchronization priority of the node is the second priority, determining that the synchronization sequence of the node is a synchronization sequence X1 in a set of out-of-network SLSS identifiers (id_oon set), and determining that the value of the distinguishing flag of the node is False;
when the synchronization priority of the node is the third priority, determining that the synchronization sequence of the node is a synchronization sequence X2 in the id_oon set, and determining that the value of the distinguishing flag of the node is False; and
when the synchronization priority of the node is the fourth priority, determining that the value of the distinguishing flag of the node is False, and determining the synchronization sequence of the node according to one of following schemes:
in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168;
in a second scheme, if the synchronization reference node of the node has the third priority, then the synchronization sequence of the node is set to be a fixed value X3;
in a third scheme, if the synchronization reference node of the node has the fourth priority, then:
if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and
in a fourth scheme, if the node operates as an independent synchronization source, then a value not smaller than 168 and not greater than 335 is randomly selected as the synchronization sequence of the node, wherein the value is not equal to X1 or X2;
wherein the id_net set is a set of synchronization sequences within network coverage, and the id_oon set is a set of synchronization sequences outside the network coverage; and X1, X2, and X3 are positive integers greater than or equal to 1.

2. The method according to claim 1, wherein when the synchronization priority of the node is the first priority, the synchronization sequence of the node is configured by the eNB via system information.

3. A synchronization device, comprising:
a processor configured to read a program in a memory to perform:
determining a synchronization priority of a node; and
determining a synchronization sequence of the node and a value of a distinguishing flag of the node according to the synchronization priority of the node, wherein the distinguishing flag indicates that the node belongs to a Global Navigation Satellite System (GNSS) synchronization scheme or an evolved Node B (eNB) synchronization scheme;
wherein the processor is further configured to perform:
determining that the synchronization priority of the node is a preset first priority, a preset second priority, a preset third priority, or a preset fourth priority;
wherein the processor is further configured to perform:
when the synchronization priority of the node is the first priority, determining that the synchronization sequence of the node is a synchronization sequence in a set of in-network side link synchronization signal (SLSS) identifiers (id_net set), the id_net set excluding (X1-168) and (X2-168), and determining that the value of the distinguishing flag of the node is True;
when the synchronization priority of the node is the second priority, determining that the synchronization sequence of the node is a synchronization sequence X1 in a set of out-of-network SLSS identifiers (id_oon set), and determining that the value of the distinguishing flag of the node is False;
when the synchronization priority of the node is the third priority, determining that the synchronization sequence of the node is a synchronization sequence X2 in the id_oon set, and determining that the value of the distinguishing flag of the node is False; and
when the synchronization priority of the node is the fourth priority, determining that the value of the distinguishing flag of the node is False, and determining the synchronization sequence of the node according to one of following schemes:
in a first scheme, if a synchronization reference node of the node has the first priority, then the synchronization sequence of the node is the same sequence as a synchronization sequence of the synchronization reference node, or the synchronization sequence of the node equals to the synchronization sequence of the synchronization reference node plus 168;
in a second scheme, if the synchronization reference node of the node has the third priority, then the synchronization sequence of the node is set to be a fixed value X3;
in a third scheme, if the synchronization reference node of the node has the fourth priority, then:
if the synchronization sequence of the synchronization reference node belongs to the id_net set, then the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and
in a fourth scheme, if the node operates as an independent synchronization source, then a value not smaller than 168 and not greater than 335 is randomly selected as the synchronization sequence of the node, wherein the value is not equal to X1 or X2;

or wherein the processor is further configured to perform:
when the synchronization priority of the node is the first priority, determining that the synchronization sequence of the node is a synchronization sequence in an id_net set excluding X1 and X2, and determining that the value of the distinguishing flag of the node is False;
when the synchronization priority of the node is the second priority, determining that the synchronization sequence of the node is the synchronization sequence X1 in the id_net set, and determining that the value of the distinguishing flag of the node is True;
when the synchronization priority of the node is the third priority, determining that the synchronization sequence of the node is the synchronization sequence X2 in the id_net, and determining that the value of the distinguishing flag of the node is True; and
when the synchronization priority of the node is the fourth priority, determining that the value of the distinguishing flag of the node is True, and determining the synchronization sequence of the node according to one of following schemes:
in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in an id_oon set, and the synchronization sequence of the node equals to the synchronization sequence of the synchronization reference node plus 168;
in a second scheme, if the synchronization reference node of the node has the third priority, then the synchronization sequence of the node is a synchronization sequence in the id_oon set, and the synchronization sequence of the node equals to a fixed value of (X2+168);
in a third scheme, if the synchronization reference node of the node has the fourth priority, then:
if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and
in a fourth scheme, if the node operates as an independent synchronization source, then a value not smaller than 168 and not greater than 335 is randomly selected as the synchronization sequence of the node;
wherein the id_net set is a set of synchronization sequences within network coverage, and the id_oon set is a set of synchronization sequences outside the network coverage; and X1, X2, and X3 are positive integers greater than or equal to 1.

4. The device according to claim 3, wherein when the synchronization priority of the node is the first priority, the synchronization sequence of the node, determined by the processor, is configured by the eNB via system information.

5. The device according to claim 3, wherein when the synchronization priority of the node is the first priority, the synchronization sequence of the node, determined by the processor, is configured by the eNB via system information.

6. A synchronization method, comprising:
  determining a synchronization priority of a node; and
  determining a synchronization sequence of the node and a value of a distinguishing flag of the node according to the synchronization priority of the node, wherein the distinguishing flag indicates that the node belongs to a Global Navigation Satellite System (GNSS) synchronization scheme or an evolved Node B (eNB) synchronization scheme;
  wherein determining the synchronization priority of the node comprises:
  determining that the synchronization priority of the node is a preset first priority, a preset second priority, a preset third priority, or a preset fourth priority;
  wherein determining the synchronization sequence of the node and the value of the distinguishing flag of the node according to the synchronization priority of the node comprises:
  when the synchronization priority of the node is the first priority, determining that the synchronization sequence of the node is a synchronization sequence in a set of in-network side link synchronization signal (SLSS) identifiers (id_net set), the id_net set excluding X1 and X2, and determining that the value of the distinguishing flag of the node is False;
  when the synchronization priority of the node is the second priority, determining that the synchronization sequence of the node is the synchronization sequence X1 in the id_net set, and determining that the value of the distinguishing flag of the node is True;
  when the synchronization priority of the node is the third priority, determining that the synchronization sequence of the node is the synchronization sequence X2 in the id_net, and determining that the value of the distinguishing flag of the node is True; and
  when the synchronization priority of the node is the fourth priority, determining that the value of the distinguishing flag of the node is True, and determining the synchronization sequence of the node according to one of following schemes:
  in a first scheme, if a synchronization reference node of the node has the first priority, then the synchronization sequence of the node is a synchronization sequence in the id_net set, and the synchronization sequence of the node is the same as a synchronization sequence of the synchronization reference node, or the synchronization sequence of the node is a synchronization sequence in a set of out-of-network SLSS identifiers (id_oon set), and the synchronization sequence of the node equals to the synchronization sequence of the synchronization reference node plus 168;
  in a second scheme, if the synchronization reference node of the node has the third priority, then the synchronization sequence of the node is a synchronization sequence in the id_oon set, and the synchronization sequence of the node equals to a fixed value of (X2+ 168);
  in a third scheme, if the synchronization reference node of the node has the fourth priority, then:
    if the synchronization sequence of the synchronization reference node belongs to the id_net set, then the synchronization sequence of the node is a synchronization sequence in the id_oon set, and the synchronization sequence of the node equals to the synchronization sequence of the synchronization reference node plus 168; or if the synchronization sequence of the synchronization reference node belongs to the id_oon set, then the synchronization sequence of the node is the same as the synchronization sequence of the synchronization reference node; and
  in a fourth scheme, if the node operates as an independent synchronization source, then a value not smaller than 168 and not greater than 335 is randomly selected as the synchronization sequence of the node;
  wherein the id_net set is a set of synchronization sequences within network coverage, and the id_oon set is a set of synchronization sequences outside the network coverage; and X1 and X2 are positive integers greater than or equal to 1.

7. The method according to claim 6, wherein when the synchronization priority of the node is the first priority, the synchronization sequence of the node is configured by the eNB via system information.

* * * * *